United States Patent [19]
Christodoulou et al.

[11] Patent Number: 5,093,148
[45] Date of Patent: Mar. 3, 1992

[54] ARC-MELTING PROCESS FOR FORMING METALLIC-SECOND PHASE COMPOSITES

[75] Inventors: Leontios Christodoulou, Baltimore; Dennis C. Nagle, Ellicott City; John M. Brupbacher, Baltimore, all of Md.

[73] Assignee: Martin Marietta Corporation, Bethesda, Md.

[21] Appl. No.: 729,781

[22] Filed: Jul. 10, 1991

Related U.S. Patent Document

[63] Continuation of Ser. No. 190,547, May 5, 1988, abandoned, which is a continuation-in-part of Ser. No. 937,032, Nov. 5, 1986, abandoned, which is a continuation-in-part of Ser. No. 662,928, Oct. 19, 1984, abandoned.

[51] Int. Cl.$^5$ .............................. B05D 3/06; B23K 9/04
[52] U.S. Cl. ..................................... 427/37; 219/76.14; 219/118; 219/119; 219/137 R; 219/137 WM; 219/137.2; 219/146.23; 219/148; 264/27; 427/294
[58] Field of Search ............... 427/37, 294; 219/76.14, 219/118, 119, 137 R, 137 WM, 137.2, 146.23, 148; 264/27

[56] References Cited

U.S. PATENT DOCUMENTS

| | | | |
|---|---|---|---|
| 3,304,604 | 2/1967 | Quaas et al. | 29/527 |
| 3,436,248 | 4/1969 | Dittrich et al. | 427/423 |
| 3,726,643 | 4/1973 | Merzhanov | 423/409 |
| 4,027,367 | 6/1977 | Rondeau | 427/37 X |
| 4,161,512 | 7/1979 | Merzhanov | 423/440 |
| 4,431,448 | 2/1984 | Merzhanov | 75/238 |
| 4,444,603 | 4/1984 | Yamatsuta | 148/127 |
| 4,687,511 | 8/1987 | Paliwal et al. | 75/0.5 B |
| 4,710,348 | 12/1987 | Brupbacher et al. | 420/129 |
| 4,738,389 | 4/1988 | Moshier et al. | 228/198 |
| 4,738,839 | 4/1988 | Moshier | 228/198 |
| 4,751,048 | 6/1988 | Christodoulou | 420/129 |
| 4,774,052 | 9/1988 | Nagle | 420/129 |

*Primary Examiner*—Bernard Pianalto
*Attorney, Agent, or Firm*—Herbert W. Mylius; Gay Chin; Alan G. Towner

[57] ABSTRACT

An arc-melting method is taught for the formation of metallic-second phase composite materials. The method involves the formation of an intermediate composite material comprising a relatively high loading of second phase particles dispersed in a metal matrix. This intermediate material is then combined with an additional amount of metal and arc-melted to form a final composite comprising a lower loading of the second phase particles dispersed in a final metallic matrix. The final metallic matrix may be comprised of a metal, metal alloy, or intermetallic, while the second phase particles may comprise ceramic materials such as borides, carbides, nitrides, silicides, oxides or sulfides.

28 Claims, No Drawings

ARC-MELTING PROCESS FOR FORMING METALLIC-SECOND PHASE COMPOSITES

CROSS REFERENCE TO RELATED APPLICATIONS

This application is a continuation of application Ser. No. 07/190,547, filed May 5, 1988, which is a continuation-in-part of application Ser. No. 937,032, filed Nov. 5, 1986, now U.S. Pat. No. 4,751,048, issued June 14, 1988, which is a continuation-in-part of application Ser. No. 662,928, filed Oct. 19, 1984, and now abandoned.

FIELD OF THE INVENTION

The present invention relates to composite materials comprising a metallic matrix having second phase particles dispersed therein. The metallic matrix may comprise a metal, metal alloy or intermetallic. The second phase may comprise at least one ceramic, such as a boride, carbide, nitride, silicide, oxide or sulfide, or may comprise an intermetallic of different composition than the matrix The process for formation of the metal-second phase composites of the present invention involves the use of arc-melting techniques for introducing the second phase particles into the final metallic matrix desired.

BACKGROUND OF THE INVENTION

Arc-melting techniques have conventionally been applied to the production of refractory metals, such as titanium and titanium alloys. In prior art processes for producing titanium ingot, titanium sponge, and optionally titanium revert, is crushed and compressed into electrode compacts which are welded together to form a long consumable electrode for vacuum arc melting. Arc melting under vacuum is necessary since it prevents the molten titanium from reacting with oxygen and nitrogen in the air. The consumable electrode becomes the anode in a vacuum arc furnace and a water-cooled copper crucible serves as the cathode An arc is struck between the compacted electrode and the copper crucible to melt the compact. The molten metal collects and solidifies in the copper crucible. For titanium alloy ingots, alloying materials are uniformly mixed with the crushed titanium sponge before compacting. Double melting is used to insure homogeneity of the ingots. In this procedure, the ingot from the first melting serves as the electrode for the second melting. Triple melting is also used in certain instances to achieve better uniformity and to reduce oxygen or nitrogen rich inclusions in the microstructure by providing an additional melting step to dissolve them. In addition to titanium and titanium alloy ingots, arc-melting procedures have been used to produce titanium aluminide intermetallic materials, such as TiAl and $Ti_3l$. The process is similar to that used for titanium alloy ingots and involves forming a compacted electrode of titanium sponge and aluminum in the proper proportions to form the desired titanium aluminide composition. Arc-melting techniques have been used to produce titanium, titanium alloy and titanium aluminide ingots weighing up to 10 tons and having diameters of up to 40 inches.

Conventional techniques for the production of metal-ceramic composites may be broadly categorized as powder metallurgical approaches, molten metal techniques, and internal oxidation processes.

The powder metallurgical type production of such dispersionstrengthened composites would ideally be accomplished by mechanically mixing metal powders of approximately 5 micron diameter or less with the appropriate oxide or carbide powder (preferably 0.01 micron to 0.1 micron). High speed blending techniques or conventional procedures such as ball milling may be used to mix the powder. Standard powder metallurgy consolidation techniques are then employed to form the final composite. Conventionally, however, the ceramic component is large, i.e., greater than 1 micron, due to a lack of availability, and high cost, of very small particle size materials since their production is energy intensive, time consuming, and costly in capital equipment. Furthermore, the production, mixing and consolidation of very small particles inevitably leads to contamination at the surface of the particles. Contaminants, such as oxides, inhibit interfacial binding between the ceramic phase and the matrix, thus adversely effecting ductility of the composite. Such weakened interfacial contact can also result in reduced strength, loss of elongation, and facilitated crack propagation. In addition, the matrix may be adversely effected, as in the case of titanium which is embrittled by interstitial oxygen. Further, composites produced by conventional powder metallurgy techniques are typically not suitable for remelting, due to the tendency for the dispersoid particles to segregate within the molten matrix metal, causing particle agglomeration upon solidification. Also, in many cases where the particulate materials are available in the desired size, they are extremely hazardous due to their pyrophoric nature.

Alternatively, molten metal infiltration of a continuous ceramic skeleton has been used to produce composites. In most cases, elaborate particle coating techniques have been developed to protect the ceramic particles from the molten metal during admixture or molten metal infiltration, and to improve bonding between the metal and ceramic. Techniques such as these have resulted in the formation of silicon carbide-aluminum composites, frequently referred to as SiC/Al, or SiC aluminum. This approach is only suitable for large particulate ceramics (e.g., greater than 1 micron) and whiskers, because of the high pressures involved for infiltration. In the molten metal infiltration technique, the ceramic material, such as silicon carbide, is pressed to form a compact, and liquid metal is forced into the packed bed to fill the intersticies. Such a technique is illustrated in U.S. Pat. No. 4,444,603, of Yamatsuta et. al., issued Apr. 24, 1984. Because of the necessity for coating techniques and molten metal handling equipment capable of generating extremely high pressures, molten metal infiltration has not been a practical process for making metal-ceramic composites.

Internal oxidation of a metal containing a more reactive component has also been used to produce dispersion strengthened metals, such as internally oxidized aluminum in copper. For example, when a copper alloy containing about 3 percent aluminum is placed in an oxidizing atmosphere, oxygen may diffuse through the copper matrix to react with the aluminum, precipitating alumina. This technique, although limited to relatively few systems since the two metals utilized must have a wide difference in chemical reactivity, has offered a feasible method for dispersion hardening. However, the highest possible level of dispersoids formed in the resultant dispersion strengthened metal is generally insufficient to impart significant changes in properties such as modulus, hardness, and the like. In addition, oxides are typically not wetted by the metal matrix, so that interfacial bonding is not optimum.

Spray forming techniques, which have conventionally been used to produce superalloy near net-shape products, have recently been applied to the formation of metal-ceramic composites. A particular spray forming process, known as the Osprey process involves providing a source of molten alloy, converting the alloy into a spray of molten droplets by means of gas atomization, directing the droplets towards a collecting surface and then recoalesing the droplets at the collector to form a near net-shape product. Metal-ceramic composite articles may be produced by injecting ceramic particles into the atomizing zone during the deposition operation. Ceramic particles in the size range of 5 microns and larger have been used to produce composites containing up to 25 volume percent ceramic. However, this technique suffers from the same disadvantages associated with powder metallurgy and molten metal processes noted above, i.e., surface contamination of the pre-formed ceramic particles, unavailability of many ceramic particles in the desired size range, unwanted particle-metal reactions, etc. Details of the Osprey process are given in an article entitled "The Spray Forming of Superalloys" by H.C. Fieldler, et.al., Journal of Metals, August 1987, hereby incorporated by reference.

In recent years, numerous ceramics have been formed using a process referred to as self-propagating high-temperature synthesis (SHS), which involves an exothermic, self-sustaining reaction which propagates through a mixture of compressed powders. The SHS process involves mixing and compacting powders of the constituent elements, and igniting the green compact with a suitable heat source. On ignition, sufficient heat is released to support a self-sustaining reaction, which permits the use of sudden, low power initiation of high temperatures, rather than bulk heating over long times at lower temperatures. Exemplary of these techniques are the patents of Merzhanov et.al. In U.S. Pat. No. 3,726,643, there is taught a method for producing high-melting refractory inorganic compounds by mixing at least one metal selected from groups IV, V, and VI of the Periodic System with a non-metal such as carbon, boron, silicon, sulfur, or liquid nitrogen, and locally heating the surface of the mixture to produce a local temperature adequate to initiate a combustion process. In U.S. Pat. No. 4,161,512, a process is taught for preparing titanium carbide by localized ignition of a mixture consisting of 80–88 percent titanium and 20-12 percent carbon, resulting in an exothermic reaction of the mixture under conditions of layer-by-layer combustion. These references deal with the preparation of ceramic materials, in the absence of a second non-reactive metallic phase.

U.S. Pat. No. 4,431,448 teaches preparation of a hard alloy by intermixing powders of titanium, boron, carbon, and a Group I-B binder metal, such as copper or silver, compression of the mixture, local ignition thereof to initiate the exothermic reaction of titanium with boron and carbon, and propagation of the reaction, resulting in an alloy comprising titanium diboride, titanium carbide, and the binder metal. This reference is limited to the use of Group I-B metals such as copper and silver, as binders. The process is performed with a relatively high volume fraction of ceramic and a relatively low volume fraction of metal (typically 6 volume percent and below, and almost invariably below 20 volume percent). The product is a dense, sintered material wherein the relatively ductile metal phase acts as a binder or consolidation aid which, due to applied pressure, fills voids, etc., thereby increasing density.

U.S. Pat. application Ser. No. 937,032, filed Nov. 5, 1986, of which the present application is a continuation-in-part, and which is hereby incorporated by reference, relates to a process for the formation of metal-second phase composites wherein an intermediate material is formed which comprises a relatively concentrated amount of second phase particles dispersed in a solvent metal matrix. This concentrated intermediate material, which may be in the form of a porous "sponge," is then introduced into a host metal to form a final composite of lower second phase loading. The final composite produced comprises a dispersion of the second phase particles within a final metallic matrix consisting of a metal, metal alloy or intermetallic. In the disclosed process, the intermediate material may be introduced into the host metal by addition to a molten bath of the host metal, or by admixing with solid host metal, followed by heating to a temperature sufficient to melt the host metal. The process of the present invention is a modification of the latter process, in that arc-melting techniques are used to heat a solid mixture of intermediate material and host metal to form the desired final metallic matrix-second phase composites.

U.S. Pat. application Ser. No. 873,890, filed June 13, 1986, which is hereby incorporated by reference, is specifically drawn to the production of metallic-second phase composites in which the metallic matrix comprises an intermetallic material, such as an aluminide. In one embodiment, a first composite is formed which comprises a dispersion of second phase particles within a metal or metal alloy matrix. This composite is then introduced into an additional metal which is reactive with the matrix metal to form an intermetallic matrix. One method for introducing the first composite into the intermetallic forming metal involves placing both the first composite and the intermetallic precursor metal together in solid form in a vessel, followed by heating to a temperature at which the intermetallic precursor metal melts. Certain embodiments of the present invention, which involve the formation of composites having intermetallic matrices, constitute an improvement of this previously disclosed process. The arc-melting methods of the present invention may advantageously be used to heat a solid mixture consisting of a first composite comprising second phase particles in a metal or metal alloy matrix, and an intermetallic precursor metal which is reactive with the metal matrix of the first composite to form an inter-metallic. A final intermetallic-second phase composite is thereby produced by the arc-melting method of the present invention.

U.S. Pat. No. 4,738,389 to Moshier et.al., which is hereby incorporated by reference, relates to a method for welding which utilizes metal-ceramic composites as weld filler material. In one embodiment, a pre-formed weld rod of metal-ceramic composite is produced which may be used in conventional welding operations such as arc, resistance, gas, laser, and electron beam type welding processes. In another embodiment, reactive ceramic-forming constituents and a solvent metal are formed into a suitable shape which may be used for welding. In this embodiment, a ceramic-forming reaction occurs during the welding process to produce the desired metal-ceramic composite filler material. The ceramic-forming constituents and solvent metal may, for example, be in the form of a rod of compacted powders or in the form of twisted wires comprising the individual ceramic-forming constituents and solvent metal. Again, conventional welding operations are used in this embodiment to produce the metal-ceramic weldment.

SUMMARY OF THE INVENTION

Is is an object of the present invention to provide a method which utilizes arc-melting techniques for forming a composite material of discretely dispersed particulate second phase material in a metallic matrix. The metallic matrix may comprise a metal, metal alloy or intermetallic, while the particulate second phase may constitute a ceramic, such as a boride, carbide, nitride, silicide, oxide or sulfide, or may constitute an intermetallic compound other than the matrix material.

It is a further object of the present invention to provide an arc-melting method for dispersing second phase particulate material in a final metallic matrix. The method involves forming an intermediate composite material comprising second phase particles dispersed throughout a solvent metal matrix, mixing the intermediate composite with a solid host metal, and arc-melting the mixture to melt the solvent metal matrix and the host metal to thereby form a dispersion of second phase particles within a final metallic matrix.

It is a further object of this invention to provide a method for dispersion strengthening of metals, metal alloys and intermetallics utilizing arc-melting techniques.

It is a further object of this inventio to provide an arc-melted compoiste material comprising second phase particles dispersed within a final metallic matrix which may be subjectd to conventional metallurgical processing steps, such as remelting, welding, heat treating, working, forging, extruding, rolling, etc.

The advantages of the present invention will become more readily undestood by consideration of the following description and examples.

DESCRIPTION OF THE PREFERRED EMBODIMENTS

The process of the present invention involves the formation of a typically porous, friable intermediate composite material which is then introduced into a host metal by arc-melting techniques to form a dense final composite product. The intermediate composite material is formed by reacting second phase-forming constituents in the presence of a solvent meal to form a finely-divided dispersion of second phase particles within a matrix of the solvent metal. This intermediate material is then introduced into a host metal, which may be the same as, or different from, the solvent metal, to form a final composite comprising a lower loading of the second phase particles within a final metallic matrix. The method of introducing the intermediate material into the host metal prefeably utilizes an arc-melting technique which involves mixing the intermediate material and host metal together in solid form and then melting the consolidated mixture in an arc-melting furance to form a dense final compoiste material. While arc-melting techniques constitute the preferred method of thepresent invention, additional techniques such as plasma arc-melting, laser melting, and electron beam melting may also be used. The final composite material produced comprises discrete second phase particles dispersed throughout a final metal, metal alloy or intermetallic matrix.

The present invention encompasses features which are directly contrary to the prior art wisdom in materials science, and particularly in the field of metal-second phase composites. For instance, the present process utilizes intermediate materials of typically low strength, high porosity, high friability, etc. Further, the process involves the use of molten metals to convert these intermediate materials of low mechanical quality to high quality, dense final composite materials.

It should be noted initially that processes resulting in the recovery of poor mechanical quality materials, as described above, yield products that have been regarded as useless in the prior art. For example, in the preparation of ceramic bodies by SHS, a limiting feature in the process has been the inherently poor mechanical quality of the body frequently formed by the self-propagating synthesis. Accordingly, attempts have been made to enhance the quality of such bodies by techniques such as elevated pressures at temperature to cause diffusion, sintering, and densification. By contrast, such properties as friability, low strength, and porosity have been found to be advantageous characteristics for the intermediate materials of the present invention.

It is also surprising that molten metal may be used to advantage in the arc-melting process of the present invention to produce high quality final composite materials. It is well known in the art that molten metal should be specifically avoided in the fabrication and utilization of composites. Several examples are known to illustrate the type of problems that can arise. In the preparation of composites of SiC in Al, precautions must be taken, such as proprietary coating techniques, to avoid prolonged direct contact of the molten metal and particulate (or the ceramic skeleton in the case of molten metal infiltration). Absent such precautions, the metal and ceramic react together, a process that obviously diminishes the a mount of particulate reinforcement, but also generates reaction products that may render the composite extremely susceptible to subsequent corrosion. analogous problems occur when attempts are made to weld the SiC/Al because, as the melting temperature of the matrix metal is exceeded, the same harmful reactions occur. In the case of thoria-dispersed (TD) nickel, the composite is produced via solid poder metallurgical techniques, as opposed to liquid metal techniques (ingot metallurgy), because the thoria ceamic tends to segregate, and even rise to the surface of the melt, due to surface tension effects. As with SiC/Al, welding is again a problem because of the presence of liquid metal, this time giving rise to the above-noted segregation. By contrast, the arc-melting method of the present invention advantageously makes use of molten metal to form final metallic matrix-second phase composites. This is particuarly surprising because arc-melting techniques constitute a relatively violent method for melting metals, in that exteemely high temperatures which are well above the melting point of the final metallic matrix may be reached.

It would thus be expected that the combination of ppor mechanical quality metal-second phase materials with molten metal would not lead to the recovery of a useful product. However, it has surpiisingly been found that employing these features according to the teachings of the present invention yields unexpected and quite unobvious benefits, yielding products that have been unattainable using prior art techniques.

In accordance with the present invention, elements which are suitable for use as second phase-forming constituents include those elements which are reactive to form ceramics or intermetallics, such as aluminum, titanium, zirconium, hafnium, vanadium, niobium, tantalum, beryllium, manganese, chromium, molybdenum, tungsten, i8ron, cobalt, nickel, copper, silicon, boron, carbon, sulfur, nitrogen, oxygen, thorium, scandium, lanthanum, yttrium, cerium and erbium. The second phase-forming constituents may be provided in elemental form, or may be provided as an aloy of the solvent metal. In addition, reactive compounds of such elements, such as boron nitride (BN), boron carbide (B$_4$C), boron oxide B$_2$O$_3$), aluminum boride (AlB$_{12}$), aluminum carbide *(Al$_4$C$_3$), aluminum nitrode (AlN), silicon carbide (SiC), copper oxide (CuO) and iron oxide (Fe$_2$O$_3$) may also be used as a source of second phase-forming constituents.

Exemplary of suitable second phase particles are ceramics, such as borides, carbides, nitrides, oxides, silicides and sulfides of metals of the fourth to sixth groups of the Periodic Table. Particularly useful ceramic second phase particles include TiB$_2$, ZrB$_2$, HfB$_2$, VB$_2$, NbB$_2$, TaB$_2$, MoB$_2$, TiC, ZrC, HfC, VC, NbC, TaC, WC, TiN, Ti$_5$Si$_3$, Nb$_5$Si$_3$, ZrSi$_2$, MoSi$_2$ and MoS$_2$. While ceramic materials constitute the prefertred second phase dispersoids, it is also possible to precipitate intermetallic materials as the second phase particles. In such instances, the particles and the matrix of the final compoiste formed must be of different composition. While the discussion herein shall focus upon ceramic materials as the second phase, or dispersoid, it is noted that intermetallic second phases are also to be included in the scope of the present invention.

Complex compounds are also suitable as second phase particle. For example, the particles ma comprise borides, carbides, or nitrodes of at least two transition-metals of the fourth to sixth groups of the Periodic Table, such as titanium niobium boride ([Ti,Nb]$_x$B$_y$) or titanium vanadium carbide ([Ti,V]$_x$C$_y$). Complex compounds containing one of the constituents of the final metallic matrix are often found to be very stable. For example, second phase particles of [Ti, Nb]$_x$B$_y$ are highly stable in both TiAl and Nb$_3$Al intermetallic final matrices. It has also been found that complex componds, in some instances, tend to form whisker shaped particles, which may be beneficial in providing enhanced mechanicla properties, such as creep resistance, in the final composites formed.

It is especially to be noted that plural second phase dispersoids may advantageously be dispersed in the final metallic matrix. This may be achieved by forming an intermediate material containing plural second phase materials within the solvent metal matrix. For example, titanium, boron and nitrogen second phase-forming constituents may be reacted in the presence of a solvent metal, such as aluminum, to form an intermediate material comprising a dispersion of TiB$_2$ and TiN particles within a matrix of the solvent metal. Alternatively, plural second phase particulate materials may be dispersed in the final metallic matrix by using multiple intermediate materials. For example, an intermediate material comprising TiB$_2$ particles in an aluminum matrix may be combined with another intermediate material comprising TiN particles in an aluminum matrix. This combination may then be mixed with titanium host metal and melted in an arc-melting furnace to form a dispersion of TiB$_2$ and TiN second phase particles within a titanium aluminide final matrix.

In accordance with the present invention, the size of the second phase particles may range from about 0.01 to about 10 microns, and more preferably may range from about 0.01 to about 5 microns. It is possible, however, to produce second phase particles of larger size, depending upon the desired use of the final composites formed. Where the second phase particles are formed in the shape of whiskers, as in the case.of complex ceramics such as titanium niobium boride, the whiskers may range in diameter from about 1 to about 5 microns and in length from about 5 to about 200 microns. More preferably, the whiskers may range in diameter from about 1 to about 3 microns and in length from about 5 to about 50 microns. The length to diameter, or aspect ratio of the whiskers may range from about 10:1 to about A wide range of second phase particle loadings are possible in the final composites of the present invention. The percentage of second phase particles may be varied considerably, depending upon the intended use of the final composite material. For dispersion strengthening purposes, second phase particle loadings of from about 1 to about 40 volume percent may be utilized. For grain refining applications, second phase loadings of from about 1 to about 10 volume percent may be used. In accordance with the process of the present invention, the intermediate materials may be comprised of from about 20 to about 80 volume percent second phase particles, while the final composites may be comprised of from about 1 to about 40 volume percent second phase.

As the solvent metal, one may use at least one metal or metal alloy capable of dissolving or at least sparingly dissolving at least one of the second phase-forming constituents and having a lesser capability for dissolving or otherwise reacting with the formed second phase particles. Thus, at the temperatures experienced during the second phase-forming reaction, the solvent metal may act as a solvent for the second phase-forming constituents, but not for the desired second phase particles.

As the host metal, one may use an additional amount of the solvent metal, or one may use a metal, metal alloy or intermetallic which forms an alloy or intermetallic with the solvent metal. During the arc-melting process of the present invention, in which the intermediate material is introduced into the host metal, temperatures above the melting point of the solvent and host metals are typically reached. Therefore, care must be taken in chosing a solvent metal/host metal combination which, when in the molten state, remains substantially inert with respect to the second phase particles. Also, it is important to prevent an undesireable amount of second phase particle dissolution or growth during the arc-melting process. The second phase particles must therefore remain stable in a melt of the solvent and host metals for an amount of time sufficient to complete the arc-melting process. While the potential choice of solvent and host metals is large, this choice is limited by adherence to the criteria noted above.

Suitable solvent and host metals include aluminum, nickel, copper, titanium, cobalt, iron, platinum, gold, silver, niobium, tantalum, boron, zinc, molybdenum, yttrium, hafnium, tin, tungsten, lithium, magnesium, beryllium, thorium, silicon, chromium, vanadium, zirconium, manganese, scandium, lanthanum, cerium, erbium and alloys or intermetallics of such metals. Preferred solvent metals include aluminum, nickel, titanium, cobalt, iron, copper, niobium, chromium, silicon, magnesium and beryllium.

In certain instances, the host metal may comprise material other than conventional metals, metal alloys or intermetallics. The host metal may, for example, be a dispersion strengthened metal such as metal containing finely dispersed erbium oxide, thoria, alumina, etc. It is important in these cases that the preexisting dispersion be stable in the molten metal for the time/temperature required for the arc-melting process. Similarly, it is possible to use a metallic-second phase composite, prepared in accordance with the present invention, as the host metal. The advantage of utilizing a material containing a second phase dispersion as the host is that a bimodal distribution of second phase types, shapes, amounts, etc. may be obtained. An example would be the use of a host metal comprising an aluminum matrix containing a dispersion of essentially equiaxed $TiB_2$ particles, into which an intermediate material containing TiN needle shaped particles is added. A combination of dispersion strengthening and high temperature creep resistance may be achieved. In accordance with the foregoing discussion, it is understood that the term "host metal" encompasses the types of materials discussed above containing preexisting second phase dispersions.

The final metallic matrix of the present invention may be comprised of a wide variety of metal, metal alloy and intermetallic materials. Suitable final matrix metals include aluminum, nickel, copper, titanium, cobalt, iron, platinum, gold, silver, niobium, tantalum, boron, zinc, molybdenum, yttrium, hafnium, tin, tungsten, lithium, magnesium, beryllium, thorium, silicon, chromium, vanadium, zirconium, manganese, scandium, lanthanum, cerium, erbium and alloys or intermetallics of such metals.

In the formation of intermetallic final matrices, a preferred class of intermetallic materials are the aluminides and silicides. Among the metallic elements capable of forming aluminides are titanium, nickel, iron, cobalt, and refractory metals such as niobium, zirconium, molybdenum, vanadium, tantalum and the like. Among the metallic elements capable of forming silicides are titanium, niobium, chromium, cobalt, vanadium, nickel, and molybdenum. Specific final intermetallic matrix materials include $Ti_3Al$, $TiAl$, $TiAl_3$, $Ni_3Al$, $NiAl$, $Nb_3Al$, $Nb_2Al$, $NbAl_3$, $Co_3Al$, $ZrAl_3$, $ZrAl_2$, $Zr_4Al_3$, $ZR_3Al_2$, $Zr_3Al$, $Fe_3Al$, $Ta_2Al$, $TaAl_3$, $Mo_3Al$, $MoAl_2$, $VAl_3$, $VAl$, $Ti_5Si_3$, $Nb_5Si_3$, $Cr_3Si$, $Cr_2Si$, $V_5Si_3$, $Ni_3Si$, $CoSi_2$ and $Cr_2Nb$. Plural intermetallic materials may be present in the final matrix. For example, a final matrix may be comprised of a two phase mixture of TiAl and $Ti_3Al$, or alternatively of a two phase mixture of $TiAl_3$ and TiAl.

It is noted that the final metallic matrices of the present invention exhibit relatively fine grain size. In general, the average grain size of the final matrices may range from about 0.1 micron to about 200 microns, and more preferably may range from about 1 micron to about 40 microns. As a specific example, an arc-melted ingot comprising a final matrix of TiAl (gamma) intermetallic reinforced with 5 volume percent $TiB_2$ second phase particles may exhibit an average colony size of approximately 30 microns.

In accordance with the present invention, various techniques may be used to produce the intermediate material or sponge. Each of these methods involves the preparation of a mixture of the second phase-forming constituents, along with at least one solvent metal which acts to form the solvent metal matrix. The mixture is then reacted by the techniques described below to form a dispersion of second phase particles within the solvent metal matrix. In each of the following embodiments, the second phase-forming constituents may be provided in the form of elemental powders, or at least one of the constituents may be provided in the form of an alloy of the solvent metal. In addition, at least one of the second phase-forming constituents may be provided from a reactive compound.

In one embodiment, the second phase-forming reaction is initiated by bulk heating a mixture comprising the second phaseforming constituents and at least one solvent metal. In accordance with the bulk heating process, the starting mixture is preferably compressed to form a compact which is then heated in, for example, a furnace to initiate the second phase-forming reaction. The reaction typically occurs at a temperature approximating the melting temperature of the solvent metal. Bulk heating may also be achieved by plasma spray techniques in which the starting mixture is introduced into a plasma flame. The starting mixture may be in the form of elemental or mechanically alloyed powders. U.S. Pat. No. 4,710,348 to Brupbacher et.al., hereby incorporated by reference, gives a detailed description of bulk heating techniques which are suitable for use in producing the intermediate materials of the present invention.

In an alternative embodiment, intermediate materials comprising second phase particles dispersed in a solvent metal matrix are formed using a local ignition process. In this process a mixture comprising the second phase-forming constituents and at least one solvent metal is compressed to form a green compact, followed by local ignition to initiate a reaction wave front which moves along the compact. The propagating reaction results in the in-situ precipitation of substantially insoluble second phase particles in the solvent metal matrix. U.S. Pat. application Ser. No. 927,014, filed Nov. 5, 1986, which is hereby incorporated by reference, gives a detailed description of local ignition techniques which are suitable for the formation of the intermediate materials of the present invention.

In accordance with the bulk heating and local ignition processes described above, the degree of porosity of the intermediate material can be varied by procedures such as vacuum degassing or compression applied prior to, during, or subsequent to initiation of the second phase-forming reaction. Porosity of the intermediate material may be minimized by a vacuum degassing operation prior to initiation of the reaction, if so desired. The degree of vacuum applied and temperature of the degassing step is determined purely by the kinetics of evaporation and diffusion of any absorbed moisture or other gases. High vacuum and elevated temperatures aid the degassing operation. Absent the degassing step, the intermediate material formed may be relatively porous and low in density. Higher porosity is, in most cases, preferred, since it is conducive to more rapid dissolution of the solvent metal matrix in the host metal during subsequent arc-melting processing. The porosity of the intermediate materials produced by the bulk heating and local ignition embodiments is typically relatively high. For example, porosity in most cases exceeds about 10 percent, and may often exceed about 25 percent. In some instances, it may be desirable to incorporate a porosity enhancer, such as a low boiling point metal, e.g., magnesium or zinc, in the initial reaction mixture. The enhancer volatilizes during the second phase-forming reaction, thereby increasing porosity of the resultant intermediate material.

Another alternative embodiment for the formation of intermediate materials involves a direct addition process. In this approach, a mixture comprising the second phase-forming constituents and at least one solvent metal is added to a molten bath of metal, resulting in the in-situ formation of second phase particles within a metal matrix. The mixture may be added to the molten metal in the form of a preform or compact. It is to be noted that a solvent metal must be present in the preform or compact to facilitate the reaction of the second phase-forming constituents. U.S. Pat. application serial No. 927,031, filed Nov. 5, 1986, which is hereby incorporated by reference, gives a detailed description of direct addition techniques which may be applied to the formation of the intermediate materials of the present invention.

In accordance with the present invention, intermediate materials formed by the methods above are then introduced into a host metal, which may be the same as, or different from, the solvent metal matrix of the intermediate material. The method of introducing the intermediate material into the host metal utilizes an arc-melting technique which involves mixing and mechanically consolidating the intermediate material and host metal together in solid form to form a compacted electrode, and then melting the consolidated mixture in a conventional arc-melting furnace to form a dense ingot of final composite material. Alloying additions may also be incorporated into the compacted electrode mixture at this time. Mixing of the intermediate material with the host metal is facilitated by crushing the intermediate material to a suitable size. This is easily achieved since the intermediate material is typically in the form of a friable, porous sponge. The host metal may be provided in any form that is convenient for mixture and consolidation with the intermediate material. For instance, a titanium host metal may be provided in the form of crushed titanium sponge. An aluminum host metal, for example, may be provided in the form of I centimeter diameter shot. Compacts of the intermediate material-host metal mixture may optionally be welded together to form a long electrode for arc-melting. In some instances, it may be advantageous to utilize intermediate material and host metal in the form of fine powders which are then mixed and compacted to form an electrode.

The compacted electrode is then melted by conventional arc-melting techniques in an electric arc furnace. Typically, the electrode acts as the anode and a water-cooled copper crucible serves as the cathode in the arc-melting procedure. An arc is struck between the compacted electrode and the copper crucible to melt the compact. The resultant molten final composite collects and solidifies in the copper crucible, thereby forming an ingot. The arc-melting procedure must usually be performed under vacuum to prevent unwanted reaction of the molten final metallic matrix with air. Multiple melting may be used to insure homogeneity of the final metallic matrix and to disperse the second phase particles more uniformly, if necessary. In multiple melting, the ingot from the first melting serves as the electrode for the second melting, and so on.

It is particularly to be noted that conventional techniques such as plasma arc, electron beam, and laser melting may be substituted for the arc-melting techniques of the present invention. Accordingly, such techniques are considered to fall within the scope of the present invention.

Also, techniques similar to those described in U.S. Pat. No. 4,738,389, listed previously, for welding with metal-ceramic composites may be utilized in the present invention for melting a mixture of intermediate material and host metal to form a final composite. For instance, the intermediate material may be crushed to a fine powder, mixed with a fine powder of host metal, and compacted into a rod which is then melted using the welding techniques of the U.S. Pat No. 4,738,389. Alternatively, the intermediate material may be formed into a wire which is then twisted with a wire of the host metal and then melted using the previously disclosed welding techniques. Further, such compacted rods or twisted wires comprising the intermediate material and host metal may be melted by techniques other than welding processes. For example, conventional plasma spray processing may be used in which the rod or wire is introduced into the stream of a plasma spray gun to effect melting, and to produce the desired final composite.

The final compositions of the arc-melting process comprise a dispersion of second phase particles throughout a final metallic matrix. Ingots of relatively large size, i.e., on the order of several thousand pounds, may be produced in one arc-melting run. Therefore, the arc-melting process of the present invention allows for the production of large, industrial quantities of metallic-second phase composite materials.

In addition to the formation of metallic-second phase ingot products, the methods of the present invention may be utilized to form other cast products. Conventional investment casting, squeeze casting, rheocasting and spray casting procedures may be used during the arc-melting process of the present invention to produce various product forms. Thus, a melt comprising a molten final composite which is formed during the arc-melting procedure may be subjected to a variety of casting procedures to yield a wide range of final composite product forms. As a specific example, a molten melt formed by the arc-melting step of the present invention may be subjected to conventional Osprey processing techniques to produce a spray-formed shape comprising the desired final metallic-second phase composite.

The following examples illustrate various aspects of the present invention. More particularly, examples 1 through 23 illustrate the production of intermediate materials which are suitable for introduction into host metals. Examples 24 through 36 illustrate the formation of compacted electrodes of intermediate material and host metal, and the arc-melting of the electrodes to form ingots of final composite materials.

EXAMPLE 1

A mixture of powders comprising 34 percent by weight titanium, 16 percent by weight boron and 50 percent by weight aluminum, is isostatically compacted to 38,000 pounds per square inch. The compacted artifact is then heated in a furnace set at a temperature of 800° C. Upon reaching approximately 670° C, a rapid increase in temperature to approximately 1250° C. is noted. The rate of increase in temperature is very rapid (greater than 900° C. per minute) followed by a fast cool down rate of approximately 400° C. per minute. On subsequent examination, the intermediate material formed is found to contain a fine dispersion (0.1–3 microns) of substantially unagglomerated titanium diboride second phase particles in an aluminum solvent metal matrix.

EXAMPLE 2

Titanium, boron, and aluminum powders are ball-milled in the proper stoichiometric proportions to provide 60 weight percent titanium diboride second phase in an aluminum solvent metal matrix. The mixture is then packed in gooch tubing and isostatically pressed to 40 ksi, forming a compact approximately 1 centimeter in diameter by 5 centimeters long and having a density of 2.39 grams per cubic centimeter. The compact is then placed end to end with a graphite rod in a quartz tube under flowing argon at atmospheric pressure. The graphite rod is heated in a radio frequency field which initiates a reaction at the interface of the compact and the rod. The reaction propagates the length of the compact at a rate of 0.77 centimeters per second. Analysis of the resultant intermediate material reveals a dispersion of substantially unagglomerated titanium diboride second phase particles having an average size of approximately 1 micron in an aluminum solvent metal matrix.

EXAMPLE pb 3

Niobium, boron, and aluminum powders are mixed in the proper stoichiometric proportions to provide 50 weight percent niobium diboride second phase in an aluminum solvent metal matrix. The mixture is packed in gooch tubing and isostatically pressed to 40 ksi, forming a compact. The compact is then placed in a quartz tube under flowing argon at atmospheric pressure and heated in a radio frequency field to initiate a reaction of the compact. An intermediate material is thereby formed comprising substantially unagglomerated niobium diboride second phase particles ranging in size from about 1 to about 7 microns dispersed in an aluminum solvent metal matrix.

EXAMPLE 4

239.5 grams of titanium powder, 60.3 grams of carbon black, and 200.2 grams of aluminum powder are ball-milled for 30 minutes, packed in gooch tubing, and isostatically pressed to 40 ksi, forming a compact 1 inch in diameter by 12 inches long. The compact is placed on two water cooled copper rails in a 4 inch diameter quartz tube under flowing argon. A 1 inch by 1 inch piece of carbon placed next to one end of the compact is induction heated until an exothermic reaction is initiated at the end of the compact. Power to the induction unit heating the carbon is turned off and the reaction is allowed to propagate the length of the compact. Analysis of the intermediate material formed reveals a dispersion of titanium carbide second phase particles within an aluminum solvent metal matrix. The titanium carbide particles have an average size of approximately 1 micron.

EXAMPLE 5

An experiment is conducted whereby molybdenum disilicide second phase particles are precipitated in an aluminum solvent metal matrix. A mixture of approximately 15 weight percent silicon, 25 weight percent molybdenum, and 60 weight percent aluminum powders is compacted and subsequently heated in a furnace. On attainment of a temperature of approximately 640° C., a sudden exotherm is noted. Subsequent X-ray and SEM analyses of the resultant intermediate material confirm the presence of molybdenum disilicide second phase particles in an aluminum solvent metal matrix.

EXAMPLE 6

A mixture of 20.5 weight percent titanium, 9.5 weight percent boron and 70 weight percent cobalt is isostatically pressed to 40 ksi and heated in a furnace. A highly exothermic reaction occurs at 800° C., with a temperature rise to about 1600° C. Subsequent X-ray analysis of the resultant intermediate material identifies the presence of titanium diboride second phase particles in a cobalt solvent metal matrix. It is shown here that if sufficient diffusion of the second phase-forming constituents into the solid solvent metal can occur, the initiation temperature of the second phase-forming reaction can be below the melting point of the solvent metal, which in this case is 1495° C., and the reaction may be initiated in the solid state.

EXAMPLE 7

A mixture of 20.6 weight percent titanium, 9.4 weight percent boron and 70 weight percent chromium is compacted to 40 ksi and then heated in a furnace. A rapid exothermic reaction is noted at approximately 880° C. The resultant intermediate material comprises titanium diboride second phase particles in a chromium solvent metal matrix.

EXAMPLE 8

A mixture of 16 weight percent aluminum, 56 weight percent chromium, 20.6 weight percent titanium, and 9.4 weight percent boron is compacted and subsequently heated in a furnace. On attainment of a temperature of about 620° C., a rapid reaction occurs, resulting in a temperature increase to over 800° C. and melting of the chromium. The temperature-time curve shows a double peak, indicating an exothermic reaction in aluminum (which typically occurs between 600°–680° C.) and a subsequent reaction in the chromium. The lower melting aluminum solvent metal therefore acts as a "low temperature initiator" for the reaction, which releases heat and induces further reaction in the higher melting chromium solvent metal. The intermediate material produced comprises titanium diboride second phase particles in a solvent metal matrix of chromium-aluminum alloy.

EXAMPLE 9

A mixture of approximately 40 weight percent zirconium, 20 weight percent boron and 40 weight percent copper powders is compacted and then heated in a furnace until a rapid exothermic reaction occurs. X-ray and SEM analyses of the resultant intermediate material show the presence of zirconium diboride second phase particles in a copper solvent matrix.

EXAMPLE 10

The following example illustrates the formation of an intermediate material comprising titanium vanadium carbide 25 ($[Ti,V]_xC_y$) second phase particles of elongated shape dispersed within an aluminum solvent metal matrix. 37 grams of Ti powder (−100 mesh), 13 grams of V powder (−325 mesh), 10 grams of C powder (−325 mesh) and 40 grams of Al powder (−325 mesh) are ball milled and isostatically pressed to 40 ksi to form a compact. The compact is heated in a radio frequency field to initiate an exothermic reaction. SEM analysis of the resultant material reveals titanium vanadium carbide second phase particles of elongated shape having widths of approximately 3 to 5 mircons and lengths of approximately 10 to 80 microns dispersed in a solvent metal matrix of Al.

EXAMPLE 11

The following example illustrates the formation of an intermediate material comprising titanium zirconium carbide ($[Ti,Zr]_xC_y$) second phase particles of elongated shape dispersed within an aluminum solvent metal matrix. Powders of $Al_4C_3$, Zr, Ti and Al are ball milled and isostatically pressed to 40 ksi to form a compact. The compact is heated in a radio frequency field to initiate an exothermic reaction. SEM analysis of the resultant intermediate material reveals titanium zirconium carbide second phase particles of elongated shape having widths of approximately 2 to 4 mircons and lengths of approximately 10 to 40 microns dispersed in a solvent metal matrix comprising Al.

EXAMPLE 12

Ti, Nb, B and Al powders (−325 mesh) are blended, packed in gooch tubing and isostatically pressed to 40 ksi to form a compact. The compact is placed on a water cooled cold finger in a quartz tube under flowing argon and is heated in a radio frequency field to initiate a reaction of the compact. Analysis of the resultant intermediate material reveals a dispersion of titanium niobium boride ($[Ti,Nb]_xB_y$) whiskers within an aluminum solvent metal matrix. The aspect ratio of the wiskers is greater than 20:1.

EXAMPLE 13

A mixture of BN, Ti and Al powders is compacted and heated to ignition at about 730° C., marked by a sudden temperature rise. X-ray and SEM analyses of the resultant intermediate material confirm the presence of $TiB_2$ and TiN second phase particles dispersed in an Al solvent metal matrix with a particle loading of about 50 weight percent. The size of the $TiB_2$ and TiN second phase particles ranges from about 1 to 10 microns.

EXAMPLE 14

A similar experiment to the one described in Example 13 is v performed except that copper is used as the solvent metal. Ignition in copper occurs at about 900° C. X-ray and SEM analyses confirm the presence of $TiB_2$ and TiN second phase particles dispersed in a Cu solvent metal matrix with a particle loading of about 50 weight percent. The size of the $TiB_2$ and TiN second phase particles is less than about 1 micron.

EXAMPLE 15

$B_4C$, Ti and Cu powders are mixed, compacted to 40 ksi and heated in a radio frequency field. A second phase-forming reaction is initiated at a temperature of about 850° C. Subsequent analysis of the resultant intermediate material reveals a dispersion of $TiB_2$ and TiC second phase particles in a Cu solvent metal matrix with a particle loading of about 30 weight percent.

EXAMPLE 16

26.9 grams of $AlB_{12}$ powder (−200 mesh), 49.3 grams of Ti powder (−325 mesh) and 23.8 grams of Al powder (−325 mesh) are ball milled for 30 minutes, packed in gooch tubing and isostatically pressed to 42 ksi. The compact is placed on two water cooled copper rails in a quartz tube under flowing argon and inductively heated to initiate an exothermic reaction. X-ray and SEM analyses of the resultant intermediate material reveal $TiB_2$ second phase particles having an approximate size range of 0.2 to 0.5 microns dispersed in an aluminum solvent metal matrix. The $TiB_2$ particles comprise approximately 74 weight percent of the first composite.

EXAMPLE 17

Powders of AlN, Ti and Al in the proper stoichiometric proportions to produce an intermediate material comprising 60 weight percent TiN second phase particles in an aluminum solvent metal matrix are ball milled and then compacted to 40 ksi. The compact is placed on a water cooled copper boat in a quartz tube under flowing argon and inductively heated to initiate an exothermic reaction. The resultant intermediate material comprises TiN second phase particles of a generally rod-like shape having widths of approximately 1 to 2 microns and lengths of 5 to 10 microns dispersed in an aluminum solvent metal matrix.

EXAMPLE 18

80 grams of Ti powder, 20 grams of C powder and 100 grams of Al powder are mixed, placed in gooch tubing and isostatically pressed to 40 ksi to form a compact. The compact is then added to molten aluminum at 750° C. in the proper proportion to yield approximately 25 weight percent titanium carbide second phase particles in an aluminum solvent metal matrix. The melt is then cast in conventional manner to form an intermediate material comprising a dispersion of titanium carbide second phase particles in aluminum solvent metal matrix.

EXAMPLE 19

Powders of Ti, Si and Al in the proper stoichiometric proportions to produce an intermediate material comprising 50 weight percent $Ti_5Si_3$ second phase particles in an aluminum solvent metal matrix are mixed and then compacted to 40 ksi. The compact is placed on a water cooled copper boat in a quartz tube under flowing argon and inductively heated to initiate an exothermic reaction. The resultant intermediate material comprises $Ti_5Si_3$ second phase particles dispersed in an aluminum solvent metal matrix.

EXAMPLE 20

Ti, V, B and Al powders (−325 mesh) are blended, packed in gooch tubing and isostatically pressed to 40 ksi to form a compact. The compact is placed on a water cooled cold finger in a quartz tube under flowing argon and is heated in a radio frequency field to initiate a reaction of the compact. Analysis of the resultant intermediate material reveals a dispersion of titanium vanadium boride ($[Ti,V]_xB_y$) whiskers within an aluminum solvent metal matrix.

EXAMPLE 21

Powders of Ti, B and Si in the proper stoichiometric proportions to produce an intermediate material comprising 50 weight percent $TiB_2$ second phase particles in a silicon solvent metal matrix are mixed and then compacted to 40 ksi. The compact is placed on a water cooled copper boat in a quartz tube under flowing argon and inductively heated to 1nitiate an exothermic reaction. The resultant intermediate material comprises TiB$_2$ second phase particles dispersed in a silicon solvent metal matrix.

EXAMPLE 22

Powders of Nb, B and Al in the proper stoichiometric proportions to produce an intermediate material comprising 50 weight percent NbB second phase particles in an aluminum solvent metal matrix are mixed and then compacted to 40 ksi. The compact is placed on a water cooled copper boat in a quartz tube under flowing argon and inductively heated to initiate an exothermic reaction. The resultant intermediate material comprises NbB second phase particles dispersed in an aluminum solvent metal matrix.

EXAMPLE 23

Powders of Zr, B, AlN and Al in the proper stoichiometric proportions to produce an intermediate material comprising 25 weight percent ZrN particles and 25 weight percent ZrB$_2$ particles (50 total weight percent second phase) dispersed in an aluminum solvent metal matrix are mixed and then compacted to 40 ksi. The compact is placed on a water cooled copper boat in a quartz tube under flowing argon and inductively heated to initiate an exothermic reaction. The resultant intermediate material comprises ZrN and ZrB$_2$ second phase particles dispersed in an aluminum solvent metal matrix.

EXAMPLE 24

Intermediate material, produced as in Example 2, comprising 60 weight percent TiB$_2$ second phase particles in an aluminum solvent metal matrix is crushed, roughly mixed with crushed titanium sponge host metal and then mechanically compacted into blocks approximately 2 inches in diameter and 3 inches in height. Several of the compacts are welded together to form a consumable electrode. The electrode is subsequently arc-melted in a consumable electrode arc-melter under vacuum, using a water-cooled copper mold, to produce a final composite ingot comprising approximately 7 weight percent TiB$_2$ second phase particles dispersed in a Ti-45Al (55 atomic percent Ti, 45 atomic percent Al) final metallic matrix.

EXAMPLE 25

Intermediate material, produced as in Example 2, comprising 60 weight percent TiB$_2$ second phase particles in an aluminum solvent metal matrix is crushed, roughly mixed with crushed titanium sponge host metal and then mechanically compacted into blocks approximately 2 inches in diameter and 3 inches in height. Several of the compacts are welded together to form a consumable electrode. Additional support is given to the electrode by welding pure titanium rods along the length of the electrode. The electrode is subsequently arc-melted in a consumable electrode arc-melter under vacuum, using a water-cooled copper mold, to produce a final composite ingot comprising approximately 7 weight percent TiB$_2$ second phase particles dispersed in a Ti-45Al (55 atomic percent Ti, 45 atomic percent Al) final metallic matrix.

EXAMPLE 26

Intermediate material, produced as in Example 2, comprising 60 weight percent TiB$_2$ second phase particles in an aluminum solvent metal matrix is crushed, roughly mixed with crushed titanium sponge host metal and then mechanically compacted into blocks approximately 2 inches in diameter and 3 inches in height. Several of the compacts are welded together to form a consumable electrode. The electrode is subsequently arc-melted in a consumable electrode arc-melter under vacuum, using a water-cooled copper mold, to produce a first ingot comprising approximately 7 weight percent TiB$_2$ second phase particles dispersed in a Ti-45Al (55 atomic percent Ti, 45 atomic percent Al) metallic matrix. This first ingot is subsequently used as an electrode and remelted in a consumable electrode arc-melter under vacuum, using a larger water-cooled copper mold, to yield a final composite ingot comprising about 7 weight percent TiB$_2$ second phase particles dispersed in a Ti-45Al (55 atomic percent Ti, 45 atomic percent Al) metallic matrix. The TiB$_2$ second phase particles of the final composite have an average size of about 3 microns, indicating that ohly a minor amount of particle growth occurred during the arc-melting procedure. The double-melted final composite ingot possesses improved uniformity and surface quality compared to the first, single-melted ingot.

EXAMPLE 27

Example 26 is repeated, with the exception that an alloying addition of vanadium is mixed with the crushed intermediate material and Ti sponge prior to compaction. The resultant final composite ingot comprises a Ti-45Al-2V (53 atomic percent Ti, 45 atomic percent Al, 2 atomic percent V) final metallic matrix having approximately 7 weight percent TiB$_2$ second phase particles substantially uniformly dispersed therein.

EXAMPLE 28

Example 26 is repeated, with the exception that the compacted electrode pf intermediate material and host metal is sintered in either an inert or vacuum furnace for a period of up to 48 hours prior to arc-melting. A final composite is produced similar to that of Example 26.

EXAMPLE 29

Example 26 is repeated, with the exception that the mixture of crushed intermediate material and host metal is isostatically pressed into a long rod to produce the electrode for arc-melting. A final composite is produced similar to that of Example 26.

EXAMPLE 30

An intermediate material, prepared as in Example 12, comprising [Ti,Nb]$_x$B$_y$ second phase whiskers in an aluminum solvent metal matrix is crushed and then mixed with another crushed intermediate material, prepared as in Example 17, comprising TiN second phase particles in an aluminum solvent metal matrix. This intermediate material mixture is roughly mixed with niobium host metal pellets and mechanically compacted to form a consumable electrode. The electrode is subsequently arc-melted in a consumable electrode arc-melter under vacuum, using a water-cooled copper mold, to produce a first ingot comprising approximately 8 total weight percent second phase particles (about 4 weight percent [Ti,Nb]$_x$B$_y$ and 4 weight percent TiN) dispersed in a Nb$_2$Al intermetallic matrix. This first ingot is subsequently used as an electrode and remelted in a consumable electrode arc-melter under vacuum, using a larger water-cooled copper mold, to yield a final composite ingot comprising about 8 total weight percent [Ti,Nb]$_x$B$_y$ and TiN second phase particles substantially uniformly dispersed in a Nb$_2$Al intermetallic matrix.

EXAMPLE 31

Intermediate material, produced in a manner similar to Example 23, comprising ZrN and ZrB$_2$ second phase particles dispersed in an aluminum solvent metal matrix is crushed, roughly mixed with zirconium host metal pellets and then mechanically compacted to form a consumable electrode. The electrode is subsequently arc-melted in a consumable electrode arc-melter under vacuum, using a water-cooled copper mold, to produce a first ingot comprising approximately 8 total weight percent ZrN and ZrB$_2$ second phase particles (4 weight percent ZrN and 4 weight percent ZrB$_2$) dispersed in an ZrAl$_3$ intermetallic matrix. This first ingot is subsequently used as an electrode and remelted in a consumable electrode arc-melter under vacuum, using a larger water-cooled copper mold, to yield a final composite ingot comprising about 8 total weight percent ZrN and ZrB$_2$ second phase particles dispersed in a ZrAl$_3$ matrix.

EXAMPLE 32

Example 29 is repeated, with the exception that the TiB$_2$/Al intermediate material is crushed to a fine powder and the titanium host metal is provided in the form of minus 325 mesh powder. A final composite is produced similar to that of Example 29.

EXAMPLE 33

Example 32 is repeated, with the exception that the rod comprising compacted powders of TiB$_2$/Al intermediate material and titanium host metal is arc-welded to form a weldment comprising a final composite similar to that of Example 32.

EXAMPLE 34

Intermediate material produced in a manner similar to Example 2, with the exception that the TiB$_2$ comprises 25 weight percent of the material, and is extruded to form a wire. The wire is then twisted with a titanium host metal wire and fed into the stream of a plasma spray gun. The resultant final composite comprises approximately 7 weight percent TiB$_2$ second phase particles dispersed in a titanium aluminide matrix.

EXAMPLE 35

Example 34 is repeated, with the exception that the twisted wires of the TiB$_2$/Al intermediate material and titanium host metal are arc-welded to form a weldment comprising a final composite similar to that of Example 34.

EXAMPLE 36

Intermediate material, produced as in Example 2, comprising 60 weight percent TiB$_2$ second phase particles in an aluminum solvent metal matrix is crushed and then added to a molten bath of aluminum, while stirring, to produce a second intermediate material comprising approximately 15 weight percent TiB$_2$ particles dispersed in an aluminum matrix. This second intermediate material is extruded to form a wire, twisted with a titanium host metal wire, and fed into the stream of a plasma spray gun. The resultant final composite comprises approximately 7.5 weight percent TiB$_2$ second phase particles dispersed in a titanium aluminide matrix.

It is noted that the present invention has a number of advantages over methods taught by the prior art. For example, this invention circumvents the need for micron sized, unagglomerated ceramic starting materials, which materials are not typically commercially available, and are often pyrophoric. This invention also eliminates the technical problems of uniformly dispersing a second phase in a molten metal, and avoids the problem of oxide or other deleterious layer formation at the second phase/metal interface during processing. The final composites of the present invention also have improved high temperature stability, in that the second phase is substantially non-reactive with the final metallic matrix. Further, as opposed to composites presently available, the final metallic-second phase composites of the present invention can be remelted and recast while retaining fine matrix grain size, fine second phase particle size, and the resultant superior physical properties of the material. Also, the final composites may be welded without degradation of material properties, and after welding possess superior corrosion resistance, when compared to metal matrix composites presently available. In addition, the final composites of the present invention are capable of being formed by conventional ingot metallurgy techniques such as extruding, forging and rolling.

The arc-melting process of the present invention also allows for the production of large, industrial quantities of metal-second phase composite materials, due to the fact that ingots of several thousand pounds may be produced in one arc-melting run.

It is understood that the above description of the present invention is susceptible to considerable modification, change, and adaptation by those skilled in the art, and such modifications, changes, and adaptations are intended to be considered to be within the scope of the present invention, which is set forth by the appended claims.

We claim:

1. A method for forming a metallic-second phase composite material ingot, the method comprising combining an intermediate composite material comprising a solvent metal matrix having in-situ precipitated second phase particles dispersed therein with a host metal to form a consumable electrode arc-melting the consumable electrode by striking an arc therewith, and recovering a final metallic-second phase composite ingot comprising a final metallic matrix having second phase particles dispersed therein.

2. A method for forming a metallic-second phase composite material ingot, the method comprising the steps of:
 (a) forming an intermediate composite material comprising particles of in-situ second precipitated second phase material dispersed in a solvent metal matrix;
 (b) combining the intermediate compsoite material with a host metal to form a consumable electrode;
 (c) arc-melting the consumable electrode by striking an arc therewith; and
 (d) recovering a final metallic-second phase composite ingot.

3. A method for forming a metallic-second phase compsoite material ingot, the method comprising forming an intermediate composite material comprising particles of in-situ precipitated second phase material dispersed in a solvent metal matrix by contacting reactive second phase-forming constituentw and a solvent metal at a temperature sufficient to initiate a reaction of the second phase-forming constituents, combining the intermediate composite with a host metal, arc-melting the combined intermediate composite material and host metal, and recovering a final metallic-second phase composite ingot comprising a final metallic matrix having second phase particles dispersed therein.

4. A method as set forth in claim 3, wherein the second phase-forming constituents are selected from the group consisting of aluminum, titanium, zirconium, fahnium, vanadiun, niobiun, tantalum, chromium, molybdenum, tungsten, iron, cobalt, nickel, copper, silicon, boron, carbon, sulfur, nitrogen, oxygen, thorium, scandium, lanthanum, yttrium, cerium and erbium.

5. A method as set forth in claim 3, wherein the solvent metal is selected from the group consisting of aluminum, nickel, copper, titanium, cobalt, iron, platinum, gold, silver, niobium, tantalum, boron, lead, zinc, molybdenum, yttrium, hafnium, tin, tungsten, lithium, magnesium, beryllium, thorium, silicon, chromium, vanadium, zirconium, manganese, scandium, lanthanum, cerium and erbium.

6. A method as set forth in claim 3, wherein the host metal is selected from the group consisting of aluminum, nickel, copper, titanium, cobalt, iron, platinum, gold, silver, niobium, tantalum, boron, lead, zinc, molybdenum, yttrium, hafnium, tin, tungsten, lithium, magnesium, beryllium, thorium, silicon, chromium, vanadium, zirconium, manganese, scandium, lanthanum, cerium and erbium.

7. A method as set forth in claim 3, wherein the final metallic matrix comprises a metal or metal alloy.

8. A method as set forth in claim 3, wherein the final metallic matrix comprises an intermetallic.

9. A method as set forth in claim 8, wherein the intermetallic is an aluminide of Ti, Ni, Co, Nb, Zr, Fe or Ta.

10. A method as set forth in claim 8, wherein the intermetallic is selected from the group consisting of $Ti_3Al$, $TiAl$, $TiAl_3$, $Ni_3Al$, $NiAl$, $Nb_3Al$, $NbAl_3$, $Co_3Al$, $Zr_3Al$, $Fe_3Al$, $Ta_2Al$, $TaAl_3$, $Ti_5Si_3$, $Nb_5Si_3$, $Cr_3Si$, $CoSi_2$ and $Cr_2Nb$.

11. A method as set forth in claim 3, wherein the second phase particles are selected from the group consisting of borides, carbides, nitrides, oxides, silicides and sulfides of at least one transition metal of the fourth to sixth groups of the Periodic Table.

12. A method as set forth in claim 11, wherein the second phase particles are selected from the group consisting of $TiB_2$, $ZrB_2$, $HfB_2$, $VB_2$, $NbB_2$, $TaB_2$, $MoB_2$, $TiC$, $ZrC$, $HfC$, $VC$, $NbC$, $TaC$, $WC$, $TiN$, $Ti_5Si_3$, $Nb_5Si_3$, $ZrSi_2$, $MoSi_2$ and $MoS_2$.

13. A method as set forth in claim 3, wherein the second phase particles comprise a complex compound selected from the group consisting of borides, carbides, or nitrides of at least two transition metals of the fourth to sixth groups of the Periodic Table.

14. A method as set forth in claim 3, wherein the second phase particles comprise from about 1 to about 40 volume percent of the final metallic-second phase composite.

15. A method as set forth in claim 3, wherein the size of the second phase particles is from about 0.01 to about 10 microns.

16. A method as set forth in claim 3, wherein the final metallic matrix has an average grain size of from about 0.1 to about microns.

17. A method as set forth in claim 3, wherein the final metallic matrix has an average grain size of from about 1 to about 40 microns.

18. A method for forming a metallic-second phase composite material ingot, the method comprising the steps of:
(a) forming an intermediate composite material comprising particles of in-situ precipitated second phase material dispersed in a solvent metal matrix;
(b) mxing the intermediate composite material with a host metal in solid form;
(c) compacting the mixture to form a consumable electrode;
(d) arc-melting the consumable electrode by striking an arc therewith; and
(e) recovering a final metallic-second phase composite ingot.

19. A method as set forth in claim 18, wherein the intermedi.afe material is crushed prior to mixing with the host metal.

20. A method as set forth in claim 18, wherein the host metal comprises titanium or an alloy thereof and is provided in the form of crushed sponge.

21. A method as set forth in claim 18, wherein the host metal comprises aluminum or an alloy thereof and is provided in the form of shot.

22. A method as set forth in claim 18, wherein multiple compacted mixtures of intermediate composite material and host metal are welded together to form the electrode.

23. A method as set forth in claim 18, wherein at least one alloying metal is mixed with the intermediate composite material and host metal.

24. A method as set forth in claim 18, wherein an additional amount of the solvent metal is mixed with the intermediate composite material and host metal.

25. A method as set forth in claim 18, wherein the arc-melting is performed in an electric arc furnace.

26. A method as set forth in claim 18, wherein the arc-melting is performed under vacuum.

27. A method as set forth in claim 18, wherein the electrode is double arc-melted.

28. A method for forming a cast product of metallic-second phase composite material, the method comprising combining intermediate composite material comprising a solvent metl matrix having in-situ precipitated second phase particles dispersed therein with host metal to form a consumable electrode, arc-melting the consumable electrode by striking an arc therewith to form a molten mass, casting the molten mass, and recovering a cast product of final metallic-second phase composite material comprising a final metallic matrix having second phase particles dispersed therein.

* * * * *

UNITED STATES PATENT AND TRADEMARK OFFICE
CERTIFICATE OF CORRECTION

PATENT NO. : 5,093,148

DATED : March 3, 1992

INVENTOR(S) : Christodoulou et al

It is certified that error appears in the above-identified patent and that said Letters Patent is hereby corrected as shown below:

On title page, item [63], Related U.S. Patent Document, "937,032" should read --927,032--.

Column 1, line 9, "937,032" should read --927,032--; line 22, after "matrix" insert a period --.--; lines 32 and 33, "titanium sponge, and optionally titanium revert, is" should read --titanium sponge and/or titanium revert would be--; line 55, "Ti$_3$1" should read --Ti$_3$Al--; line 68, after "dispersionstrengthened" should read --dispersion strengthened--.

Column 4, line 4, "937,032" should read --927,032--; line 51, "inter-metallic" should read --intermetallic--.

Column 5, line 30, after "niques." insert the following paragraph:
   --It is yet a further object of the invention to provide a method for grain refining metals, metal alloys and intermetallics which utilizes arc-melting techniques.--
line 31, "inventio" should read --invention--; line 32; "compoiste" should read --composite--; line 34, "subjectd" should read --subjected--; line 38, "undestood" should read --understood--; line 49, "meal" should read --metal--; line 57, "prefeably" should read --preferably--; line 60, "furance" should read --furnace--; line 61, "compoiste" should read --composite--; line 63, "thepresent" should read --the present--.

Column 6, line 39, "a mount" should read --amount--; line 42, "analogous" should read --Analogous--; line 47, "poder" should read --powder--; line 49, "ceamic" should read --ceramic--; line 58, "exteemely" should read --extremely--; line 62, "ppor" should read --poor--; line 64, "surpiisingly" should read --surprisingly--.

UNITED STATES PATENT AND TRADEMARK OFFICE
CERTIFICATE OF CORRECTION

PATENT NO. : 5,093,148
DATED : March 3, 1992
INVENTOR(S) : Christodoulou et al

It is certified that error appears in the above-identified patent and that said Letters Patent is hereby corrected as shown below:

Column 7, line 7, "i8ron" should read --iron--; line 11, "aloy" should read --alloy--; line 15, delete "*"; same line, "nitrode" should read --nitride--; line 27, "prefertred" should read --preferred--; line 31, "compoiste" should read --composite--; line 37, "particle" should read --particles--; same line, "ma" should read --may--; line 38, "nitrodes" should read --nitrides--; same line, delete the hyphen "-"; line 47, "ponds" should read --pounds--; line 48, "mechanicla" should read --mechanical--.

Column 8, line 18, after "about" insert --100:1.--.

Column 9, line 48, before "$Zr_4Al_3$" insert --$Zr_2Al_3$--; same line, "$ZR_3Al_2$" should read --$Zr_3Al_2$--.

Column 10, line 14, "phaseforming" should read --phase forming--; lines 64 and 65, "rel.-tiavely" should read --relatively--.

Column 11, line 16, after "1986," insert --now U.S. Patent No. 4,915,908--; line 43, "I" should read --1--.

Column 13, line 12, "gooch" should read --Gooch--; line 26, "EXAMPLE pb 3" should read --EXAMPLE 3--; line 32, "gooch" should read --Gooch--; line 45, "gooch" should read --Gooch--;.

Column 14, line 62, delete "25"; line 67, "ball milled" should read --ball-milled--.

Column 15, line 4, "mircons" should read --microns--; line 13, "ball milled" should read --ball-milled--; line 19, "mircons" should read --microns--; line 25, "gooch" should read --Gooch--; lines 32 and 33, "wisk-ers" should read --whiskers--; line 47, after "is" delete

UNITED STATES PATENT AND TRADEMARK OFFICE
CERTIFICATE OF CORRECTION

PATENT NO. : 5,093,148  
DATED : March 3, 1992  
INVENTOR(S) : Christodoulou et al Page 3 of 4

It is certified that error appears in the above-identified patent and that said Letters Patent is hereby corrected as shown below:

--v--; line 67, "ball milled" should read --ball-milled--; line 68, "gooch" should read --Gooch--.

Column 16, line 15, "ball milled" should read --ball-milled--; line 27, "gooch" should read --Gooch--; line 52, "gooch" should read --Gooch--; line 68, "Initiate" should read --initiate--.

Column 17, line 21, "ZrB2" should read --ZrB$_2$--.

Column 18, line 18, "ohly" should read --only--; line 36, "pf" should read --of--.

Column 20, line 43, after "electrode" insert a comma --,--; line 52, delete "second"; line 55, "compsoite" should read --composite--; line 62, "compsoite" should read --composite--; line 66, "constituentw" should read --constituents--.

Column 21, line 10, "fahnium" should read --hafnium--; same line, "vanadiun" should read --vanadium--; same line, "niobiun" should read --niobium--.

UNITED STATES PATENT AND TRADEMARK OFFICE
CERTIFICATE OF CORRECTION

PATENT NO. : 5,093,148

DATED : March 3, 1992

INVENTOR(S) : Christodoulou et al

It is certified that error appears in the above-indentified patent and that said Letters Patent is hereby corrected as shown below:

Column 22, line 6, after "about" insert --200--; line 16, "mxing" should read --mixing--; line 25, "intermedi.afe" should read --intermediate--; line 52, "metl" should read --metal--.

Signed and Sealed this

Eighteenth Day of January, 1994

Attest:

BRUCE LEHMAN

Attesting Officer

Commissioner of Patents and Trademarks